United States Patent
Popa (10) Patent No.: US 10,749,823 B1
(45) Date of Patent: Aug. 18, 2020

(54) GEOSPATIAL CHAT BOT USING NATURAL LANGUAGE PROCESSING

(71) Applicant: International Business Machines Corporation, Armonk, NY (US)

(72) Inventor: Georgeta Popa, Westminster, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/357,805

(22) Filed: Mar. 19, 2019

(51) Int. Cl.
| | |
|---|---|
| *G06F 15/16* | (2006.01) |
| *H04L 12/58* | (2006.01) |
| *G06F 16/9035* | (2019.01) |
| *G06F 16/29* | (2019.01) |
| *G06F 40/295* | (2020.01) |

(52) U.S. Cl.
CPC .......... *H04L 51/02* (2013.01); *G06F 16/29* (2019.01); *G06F 16/9035* (2019.01); *G06F 40/295* (2020.01)

(58) Field of Classification Search
CPC ..... H04L 51/02; G06F 16/9035; G06F 16/29; G06F 40/295
USPC ........................................................ 709/206
See application file for complete search history.

(56) References Cited

U.S. PATENT DOCUMENTS

| | | | |
|---|---|---|---|
| 2008/0010259 A1 | 1/2008 | Feng | |
| 2012/0016678 A1* | 1/2012 | Gruber | G06F 3/167 704/275 |
| 2012/0303273 A1* | 11/2012 | Su | G01C 21/3632 701/533 |
| 2014/0331176 A1* | 11/2014 | Cheng | G06F 3/0481 715/808 |
| 2015/0198452 A1* | 7/2015 | Gupta | G01C 21/3461 701/533 |
| 2017/0103088 A1 | 4/2017 | Tuukkanen | |
| 2019/0003849 A1 | 1/2019 | Pahwa | |

FOREIGN PATENT DOCUMENTS

EP 3149728 B1 4/2017

* cited by examiner

Primary Examiner — Atta Khan
(74) Attorney, Agent, or Firm — David B. Woycechowsky (57) ABSTRACT

Use of a chatbot interface to display maps, representing geographic areas, according to user specifications. In some embodiments, a user can enter commands through the geospatial chatbot to specify what geographic area is displayed on a map display (for example, user commands successive maps that zoom in, or out, to specified geographic area). In some embodiments, the user can specify through the geospatial chatbot what map attributes are displayed on the map (for example, restaurants, fires, schools, homes for sale, roads, elevation indication lines, isotherms, etc.). In some embodiments the user can filter, through the geospatial chatbot, map attributes to be within a specified value range (for example, only restaurants that take credit cards).

3 Claims, 5 Drawing Sheets

GEOSPATIAL CHAT BOT USING NATURAL LANGUAGE PROCESSING

BACKGROUND

The present invention relates generally to the field of computer display of maps, and more particularly to computer displays of maps having user specified map areas or map attributes.

It is known that computers can display maps. It is known that computers can display maps of various geographic areas (for example, map of the United States, map of the state of Texas, map of the city of Austin, Tex., map of downtown Austin, Tex.). It is known that maps displayed on computers can display selected attributes, such as streets, types of businesses/services (for example, restaurants, schools, banks), demographic attributes (for example, median income of residents, average age of residents, language most commonly spoken), isotherms, events (for example, fires, meteor strikes, places a given rock band has played).

The Wikipedia entry for chatbot, as of 6 Mar. 2019, states in part as follows: "A chatbot (also known as a smartbot, talkbot, chatterbot, Bot, IM [instant messaging] bot, interactive agent, conversational interface, Conversational AI [artificial intelligence], or artificial conversational entity) is a computer program or an artificial intelligence which conducts a conversation via auditory or textual methods. Such programs are often designed to convincingly simulate how a human would behave as a conversational partner, thereby passing the Turing test. Chatbots are typically used in dialog systems for various practical purposes including customer service or information acquisition. Some chatbots use sophisticated natural language processing systems, but many simpler ones scan for keywords within the input, then pull a reply with the most matching keywords, or the most similar wording pattern, from a database . . . . Today, most chatbots are accessed via virtual assistants such as Google Assistant and Amazon Alexa, via messaging apps such as Facebook Messenger or WeChat, or via individual organizations' apps and websites. Chatbots can be classified into usage categories such as conversational commerce (e-commerce via chat), analytics, communication, customer support, design, developer tools, education, entertainment, finance, food, games, health, HR [human resources], marketing, news, personal, productivity, shopping, social, sports, travel and utilities."

SUMMARY

According to an aspect of the present invention, there is a method, computer program product and/or system that performs the following operations (not necessarily in the following order): (i) displaying, on a display device, a first geographic map representing a first geographic area in human understandable form and format; (ii) receiving, from a user and through a geospatial chatbot, first natural language user input; (iii) responsive to the receipt of the first natural language user input, parsing, by the geospatial chatbot, the first natural language user input to determine a second geographic area indicated by the first natural language input; (iv) further responsive to the receipt of the first natural language user input, generating a second map display data set corresponding to a second geographic map of the second geographic area; and (v) displaying, on the display device, the second geographic map representing the second geographic area in human understandable form and format based on the second map display data set.

According to a further aspect of the present invention, there is a method, computer program product and/or system that performs the following operations (not necessarily in the following order): (i) displaying, on a display device, a first geographic map representing a first geographic area in human understandable form and format; (ii) receiving, from a user and through a geospatial chatbot, first natural language user input; (iii) responsive to the receipt of the first natural language user input, parsing, by the geospatial chatbot, the first natural language user input to determine an identity of a first type of map attribute indicated by the first natural language input; (iv) further responsive to the receipt of the first natural language user input, generating a second map display data set corresponding to a second geographic map of the of the first geographic area that includes a visual indication of map attribute features of the first type of map attribute; and (v) displaying, on the display device, the second geographic map in human understandable form and format based on the second map display data set.

According to a further aspect of the present invention, there is a method, computer program product and/or system that performs the following operations (not necessarily in the following order): (i) displaying, on a display device, a first geographic map representing a first geographic area in human understandable form and format, with the first geographic map including a visual indication of map attribute features of a first type of map attribute; (ii) receiving, from a user and through a geospatial chatbot, first natural language user input; (iii) responsive to the receipt of the first natural language user input, parsing, by the geospatial chatbot, the first natural language user input to determine a filtration range that limits the map attribute features of the first type of map attribute; (iv) further responsive to the receipt of the first natural language user input, generating a second map display data set corresponding to a second geographic map of the of the first geographic area with a visual indication of map attribute features of the first type of map attribute filtered according to the filtration range; and (v) displaying, on the display device, the second geographic map in human understandable form and format based on the second map display data set.

DETAILED DESCRIPTION

Various embodiments of the present invention are directed to the use of a geospatial chatbot interface to display maps, representing geographic areas, according to user specifications. In some embodiments, a user can enter commands through the geospatial chatbot to specify what geographic area is displayed on a map display (for example, user commands successive maps that zoom in, or out, to specified geographic area). In some embodiments, the user can specify through the geospatial chatbot what map attributes are displayed on the map (for example, restaurants, fires, schools, homes for sale, roads, elevation indication lines, isotherms, etc.). In some embodiments the user can filter, through the geospatial chatbot, map attributes to be within a specified value range (for example, only restaurants that take credit cards). This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
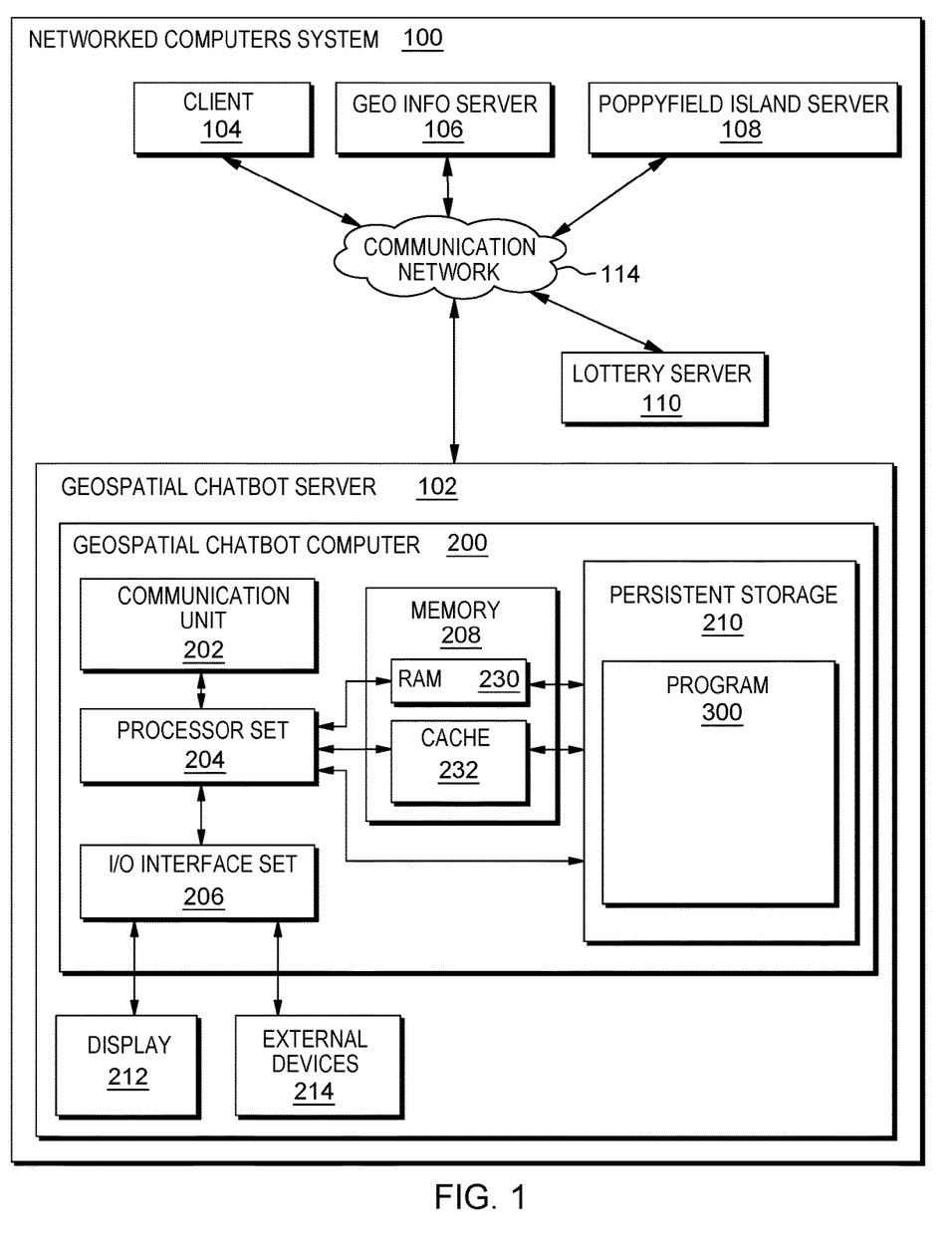
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: geospatial chatbot server sub-system 102; client sub-system 104; geo info server sub-system 106; Poppyfield Island server sub-system 108; lottery server sub-system 110; communication network 114; geospatial chatbot computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
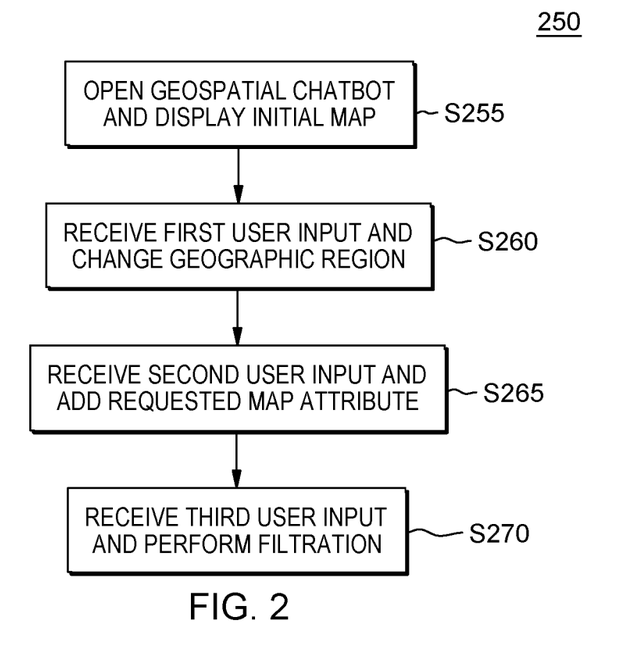
FIG. 2 is a flowchart showing a first embodiment method performed, at least in part, by the first embodiment system.
Figure 3:
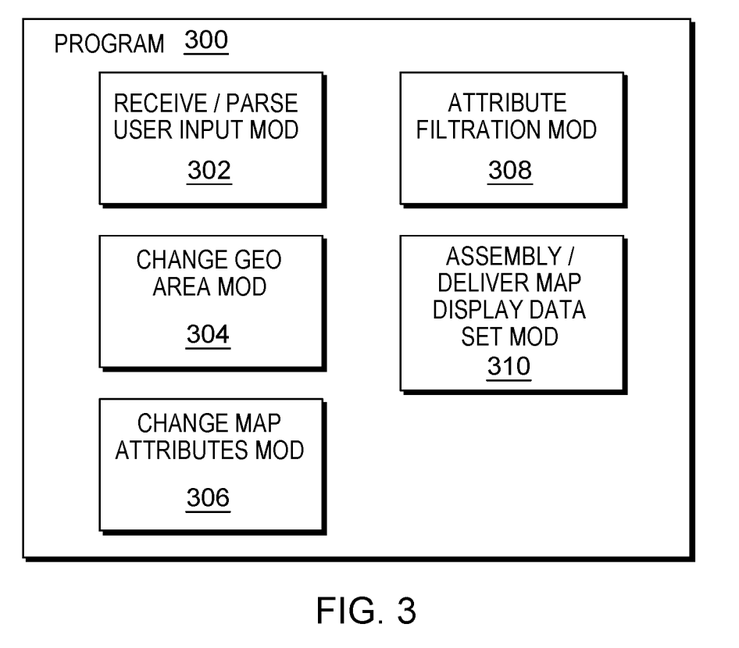
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Figure 4A:
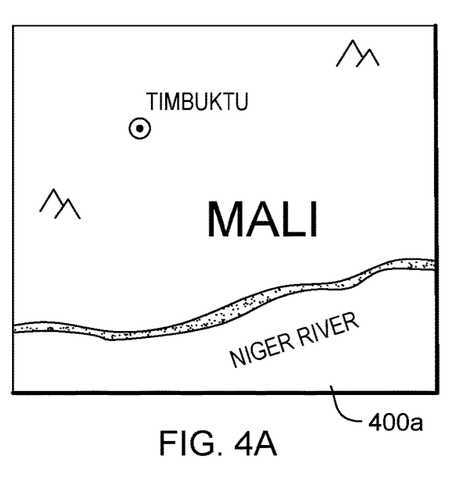
FIGS. 4A-4D are screenshot views generated by the first embodiment system.

Processing begins at operation S255, where the end user at client sub-system 104 starts up the geospatial chatbot. In this example, the geospatial chatbot is speech based only, meaning that the chat text does not appear on the display. Alternatively or additionally, and as will be discussed in the following sub-section of this Detailed Description section, the geospatial chatbot can be text based (for example, the user would enter natural language text through a keyboard and the text of the geospatial chatbot chat would appear in a chat window. In this example, the initial map display, shown by screen shot 400a of FIG. 4A, is the ancient city of Timbuktu in the nation of Mali, 20 kilometers north of the Niger River. In this example, this area shown by the first map display is a first geospatial area. More specifically, at operation S255, assemble/deliver map display data set module ("mod") 310: (i) receives geographical data from geo info server 106 through communication network 114 (see FIG. 1; (ii) assembles a first map display data set (corresponding to the display of screen shot 400a); and (iii) delivers the first map display data set to client sub-system 104 for display at client sub-system 104.

Figure 4B:
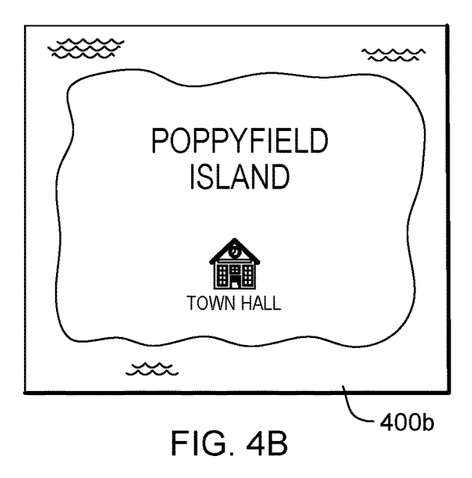

Processing proceeds to operation S260, where: (i) the end user at client sub-system 104 says "change geo to pi cubed latitude north and a longitude corresponding to yesterday's winning lottery number"; (ii) this speech data is sent to receive/parse user input mod 302; (iii) change geo area mod 304 determines a second geographic area corresponding to the natural language input (this is done with assistance from geo info server 106 and lottery server 110 (see FIG. 1)); (iv) assemble/deliver map display data set mod 310 generates a second map display data set corresponding to the second geographic area; and (v) mod 310 delivers the second map display data set to client sub-system 104 for viewing by the end user. As shown in screen shot 400b of FIG. 4B, the second geographic area corresponds to Poppyfield Island. In this example the change from the first geographic area to the second geographic area completely changes the geographic area as shown between successive map displays 400a, 400b. Alternatively, the end user may have the geospatial chatbot change the geographic area between successive maps by zooming in or out, as will be further discussed in the following sub-section of this Detailed Description section.

Processing proceeds to operation S265 where: (i) the end user at client sub-system says "show map attribute of unoccupied driverless vehicles"; (ii) this speech data is sent to receive/parse user input mod 302; (iii) mod 302 determines a map attribute corresponding to the natural language input; (iv) change map attributes mod 306 and assemble/deliver map display data set mod 310 generate a third map display data set corresponding to the second geographic area (which is not changed relative to the second map display); and (v) mod 310 delivers the third map display data set to client sub-system 104 for viewing by the end user. As shown in screen shot 400c of FIG. 4C, the third map display shows the unoccupied vehicles currently driving around Poppyfield Island. More specifically, Poppyfield Island tracks the locations of unoccupied driverless vehicles on the island and makes this information publically available through Poppyfield Island server 108. In this example, the third map display 400c is a video display because the unoccupied driverless vehicles are driving around the island in real time.

Figure 4C:
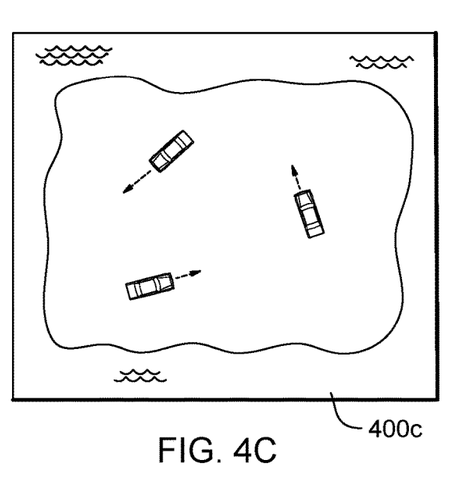

In this example, the "map attribute" is unoccupied driverless vehicles. Generally speaking, a map attribute is any feature that is any geographically correlated parameter that can be shown on a map in human understandable form and format. The next sub-section of this Detailed Description section gives many additional examples of types of map attributes and specific map attributes.

Figure 4D:
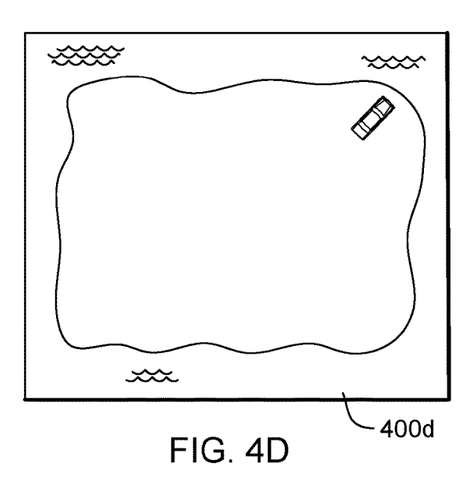

Processing proceeds to operation S270 where: (i) the end user at client sub-system says "filter unoccupied driverless vehicles map attribute to show only vehicles that have stopped adjacent to a poppy field for at least five minutes in the past two hours"; (ii) this speech data is sent to receive/parse user input mod 302; (iii) mod 302 determines the meaning of the filtration instruction given by the natural language of the end user; (iv) assemble/deliver map display data set mod 310 filters the map attribute of unoccupied driverless vehicles to determine a subset of these vehicles that have recently been stopped by a poppy field for at least five minutes; (v) attribute filtration mod 308 and assemble/deliver map display data set mod 310 generate a fourth map display data set filtered, with respect to the map attribute of unoccupied driverless vehicles, based on the filtration command; and (vi) mod 310 delivers the fourth map display data set to client sub-system 104 for viewing by the end user. As shown in screen shot 400d of FIG. 4D, the fourth map display shows only one unoccupied vehicle which is currently stopped by the dock at the harbor in the northeast corner of Poppyfield Island.

As those of ordinary skill in the art will understand, there are many types and various of filtration commands that may be used in connection with various embodiments of the present invention. The next sub-section of this Detailed Description section gives many additional examples of types of filtration instructions. The subset of map attributes that are effectively selected by a filtration operation as sometimes referred to herein a "range," even though the subset may not correspond to a strict numerical range (for example, filtering the map attribute of buildings to show only stucco buildings).

III. Further Comments and/or Embodiments

Some embodiments of the present invention may recognize one, or more, of the following facts, potential problems and/or potential areas for improvement with respect to the current state of the art: (i) when it comes to geo spatial data and analyses there are many unexplored opportunities for new business solutions; (ii) with the increasing popularity of geospatial components in each application there is a need to expose this to the end user in different ways; (iii) many end users are not familiar with these specialized features, but there is a big need of using them; (iv) some use cases for enabled geospatial component inside applications include security, defense, insurance, land management, planning, constructions, emergency responders; (v) however, one of the current issues with integrating and using the geospatial component is the end user capability to learn all new tools and concepts; (vi) for end users is difficult to navigate and find the right answers, picking the right geoprocessing tool and action on the map; (vii) also, sometimes the users are on the field and they can't touch the phone or computer and need immediate help; (viii) chatbots are becoming increasingly popular as an interesting and interactive medium for the provision of information; and/or (ix) therefore, a need exists to develop an effective approach for exposing geospatial features to any end user through using natural language processing services through a geospatial chat bot.

Some embodiments of the present invention may include one, or more, of the following features, characteristics and/or advantages: (i) a system and method for geospatial visualization, navigation, and cartographic analyses using Natural Language Processing (NLP); (ii) a Geospatial Chat Bot (GCB); (iii) translates natural language from a geospatial chat bot into actions on a mapping application; (iv) helps any user with, or without, GIS (Geographic Information System) knowledge to navigate on a map, quickly to find the right resources and answers when using tools according to various embodiments of the present invention; (v) profile variables can be created that enable the chatbot owner to better personalize a conversation to assess the correspondent details as, for example, preferred location, preferred data to be visualized on the map, potential geoproces sing analysis needed, etc.; and/or (vi) the information gathered about the correspondent can be combined with other sources of information and interpreted using assessment tools to produce, for example, a guided suggestion on map changes that will help the user quickly find the right resources and answers when using the application.

Some embodiments of the present invention may include one, or more, of the following features, characteristics and/or advantages: (i) provides additional differentiated geospatial solutions; (ii) can be used with pre-existing software products/services, such as Watson Conversation Assistant and pre-existing voice assistants; and/or (iii) voice activated requested for customized maps.

Some embodiments of the present invention may include one, or more, of the following features, characteristics and/or advantages: (i) creates a corpus for geospatial dialog like: zoom to my location, zoom to state, zoom in, show me agency data, clear map, create a buffer, etc.; and/or (ii) with each defined "intent" (sometimes referred to as "event") the geospatial chat bot is broadcasting a json (JavaScript Object Notation) message for each intent (that is event) type.

Some possible examples of event types and/or events for use in various embodiments of the present invention are respectively discussed in the following paragraphs.

"Show me the map" event types will broadcast the following:
{
"action":"showMap"
}

"Zoom to State, Zoom to California" event type and/or event will broadcast the following:
{
"action":"zoom",
"type": "state",
"value": "California"
}

"Show me Landfire Data on the map" event will broadcast the following:
{
"action":"addData",
"type":"referenceData",
"value":"landfireData"
}

Some embodiments of the present invention may include one, or more, of the following features, characteristics and/or advantages: (i) the application that integrates the geospatial chat bot (the mapping application, or the map viewer as a service) will listen to the events coming from the Geospatial Chat Bot and will take actions on the map for each message received; (ii) for example when getting an event zoom to California will zoom the map to California; (iii) the user can use the geospatial chat bot typing or using voice (the geospatial chat bot can integrate also the Speech to Text and Text to Speech services); (iv) the map will also broadcast different messages to the chat bot if a specific action failed or needs additional information; (v) the Geospatial Chat Bot will listen to these event and respond to the user of the bot; (vi) for example if the request is to add landfire data it may ask back what version of the data the user wants to see; (vii) this geospatial chat bot integration allows a two way communication between the map viewer and the geospatial chat bot; and/or (viii) if the application that want to integrate the geospatial chat bot doesn't have a map viewer, then chat bot provider companies can create a map viewer as a service and offer that to the customers and the map viewer as a service will work with the geospatial chat bot and these together can be integrated in any application, independent of what framework they use.

Figure 5:
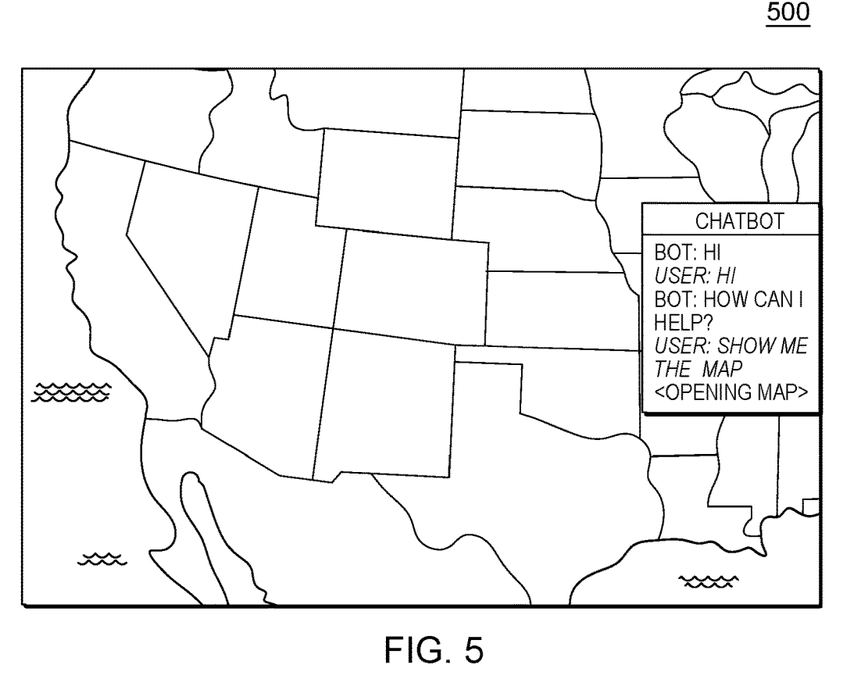
FIG. 5 is a screenshot view of a map generated by an embodiment of the present invention.
Figure 6:
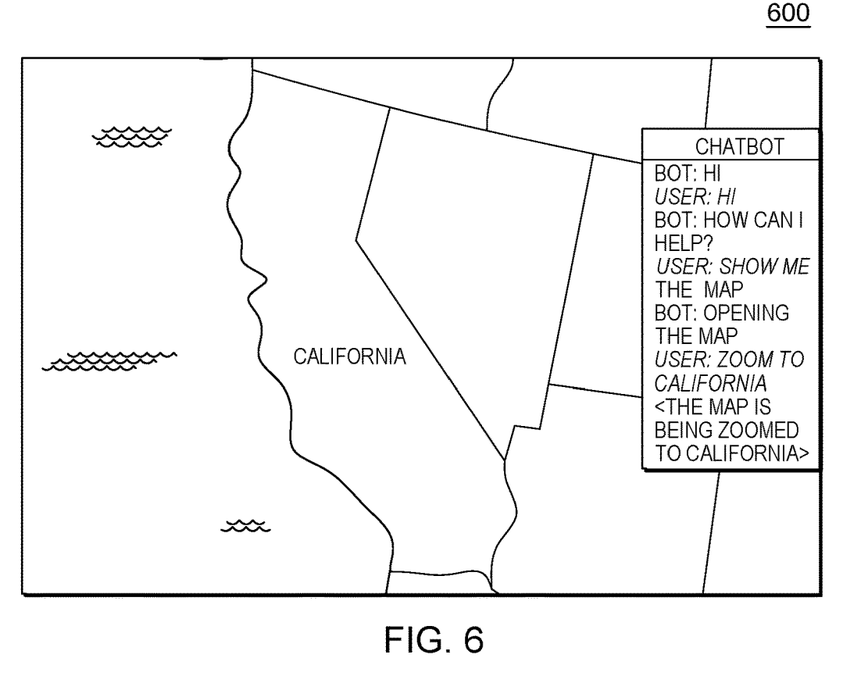
FIG. 6 is a screenshot view of a map generated by an embodiment of the present invention.
Figure 7:
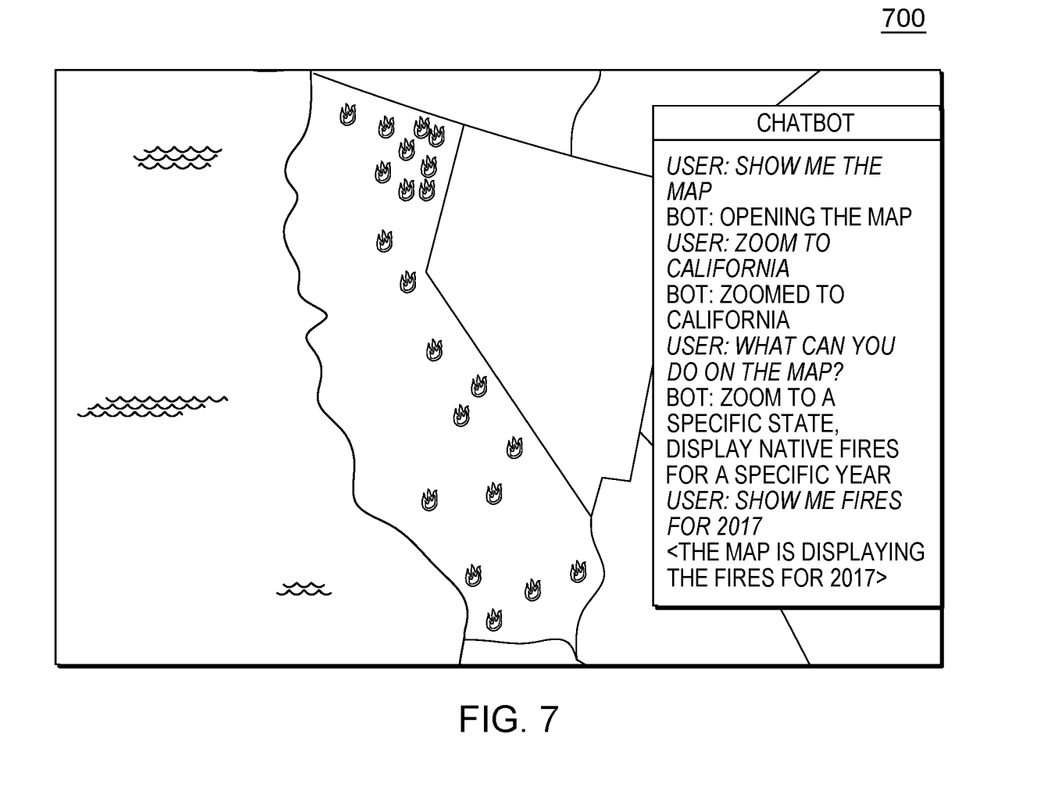
FIG. 7 is a screenshot view of a map generated by an embodiment of the present invention.

The user starts the Geospatial Chat Bot and opens the map, which is shown in screenshot 500 of FIG. 5. Then the user then asks the chatbot to generate a new map that zooms in on California, which is shown in screenshot 600 of FIG. 6. Then the user asks the chatbot to generate a new map to show wildfires that occurred within the area of the zoomed-in map of California in the year 2017, which is shown in screenshot 700 of FIG. 7. In this example, the user then asks the chatbot to generate a new map that shows a "fuel model" for the 2017, which is shown by green shading on the new map (this map is not shown in the Figures because patent drawings generally cannot show color).

Some embodiments of the present invention may include one, or more, of the following features, characteristics, operations and/or advantages: (i) natural language execution of geospatial visualization, navigation and cartographic analysis; (ii) uses multiple layers of data and information to provide for maps showing various combinations of the layers that can be requested by natural language through the chatbot interface; (iii) provides multi-layer maps for purposes of analysis and drilling down to a final geospatial result set; (iv) saves the query context; (v) keeps track of what layers were added/subtracted as successive map displays are requested and generated for use in geospatial analyses; and/or (vi) the system keeps track of the last result produced and saves that context allowing the user to use that as the starting point for another analysis in order to help users find answers.

Some embodiments of the present invention may include one, or more, of the following features, characteristics and/or advantages: (i) the system user experience is a multi-layer, multi query workflow using natural language which is displayed back to the user; (ii) system will first translate from natural language (either text or voice into complex multi-layer geospatial analyses commands, which will be then executed with the results displayed to the user; (iii) each layer of data/information used or requested will build a successive geospatial context; (iv) with each user interaction the system will refine that context and if the system is not sure if a context needs to be changed/refined will ask back the user for clarification; (v) there will be predefined commands that will clear a specific context and help move into another workflow (for example if the user will say "let's start over" the system will ask for confirmation and if confirmation is received will clear the map and reset the context to an initial state); (vi) any GIS layer can represent a geospatial context; and/or (vii) the geospatial layers/data will be used in conjunction with geospatial analysis available.

Some examples of geospatial layers and geospatial analyses that can be used to derive information to the user, examples of geospatial layers/data and/or examples of geospatial layers/context that can be used and also different geospatial analysis include the following: (i) boundaries (for example, states, counties, agencies, federal admin areas, etc.); (ii) natural and cultural resources (for example, elevation, roads and trails, critical habitat, ozone, etc.); (iii) infrastructure (for example, facilities, buildings, mines, campgrounds, communication towers, gas pipelines, etc.); (iv) disturbance data (for example, fire data, incident data, crime data, etc.); (v) demographic data (for example, census data, population, employment, density, gender, ethnicity, etc.); and (vi) risk data (for example, flood plans, fire risk areas, etc.). Additionally or alternatively, other types of layers can be used depending on the use case and who is using the system. Data can be specific to the industry where this invention is implemented like security, defense, insurance, land management, planning, constructions, emergency responders, etc.

Examples of geospatial analyses that can be used to combine and drill down into layers of information include: (i) elevation ranges in conjunction with data displayed (for examples displaying only town that are at over 1700 meters elevation, or displaying trails at over 2500 meters, etc.); (ii) proximity to another layer of information like: (a) proximity of a layer of data to natural landscape features like rivers, water bodies, mountains, forests, etc., and/or (b) proximity of a layer of data to manmade features like cities, train stations, restaurants, schools, gas stations, theaters, etc., (iii) intersection with another layer of information, such as spatial intersection between geospatial layers (for example asking only for fires started on United States Forest Service land); (iv) buffering, such as adding specific size buffers around location or features (for example displaying only restaurants that are maximal 25 kilometers around a specific place); (v) travel time, such as calculating travel time to different landmarks in order to filter down the number of results displayed (for example someone will want to see only shops where they can drive or walk for maximum 15 minutes); (vi) travel distance, such as calculating travel distance to specific landmarks in order to filter down the number of results displayed (for example someone will want to see all the houses for sale from which they will travel to nearby schools only a specific number of miles); and/or (vii) attribute queries like lot size, fire size, city name. With respect to item (vii) on the foregoing list, attribute queries can be implemented in order to filter the data displayed, and the system will notify the user for each layer what type of attributes they can use in order to refine their search. The list in this paragraph reflects some common Geographic Information System (GIS) queries that may be applied, but other, more specialized, queries can be enabled if needed. All these types of geospatial queries/analyses can be used individually or can be combined into a multi query. This way the result gets refined based on user needs.

An example of a workflow that the system can handle (also sometimes herein referred to as a "use case") will be discussed in the following paragraphs. This use case is directed to interacting with a geospatial chatbot to display certain, selected wildfires in California (spatial intersections showing only fires inside the state of California).

The use case starts with a map of the United States displayed, and a chatbot window opened up. The user says (out loud): "Zoom to California." The chatbot interface converts this speech to text and: (i) displays the text in the chatbot window; (ii) displays a new map display that is zoomed in to the state of California; and (iii) displays text in the chatbot window that says: "California map now displayed." To do this, the chatbot interface sets a "potential context" as being the State of California, meaning that the geographic area that is displayed is California.

The user then says: "Show me fires from 2017 in this state." The chatbot interface responds by: (i) converting this speech to text; (ii) displaying this text in the chatbot window; (iii) displaying a new map display showing California with fire symbols over the locations of recorded fires from the year 2017 (that is, the chatbot interface will display fires from 2017 only inside the state of California); and (iv) displays text in the chatbot window that reads "2017 California fires now displayed."

The user then says: "I would like extra refinement of the data so that only the fires larger than 100,000 acres are shown." The chatbot interface responds by: (i) converting this speech to text; (ii) displaying this text in the chatbot window; (iii) displaying a new map display showing California with a couple of zones marked in cross hatching to show the areas impacted by fires over 100,000 acres in area (now that many fewer fires are displayed and the fires displayed are large, the fire symbols of the 100,000 acre plus are changed to showing the fire areas); and (iv) displays text in the chatbot window that reads "2017 California fires over 100,000 acres in area are now displayed." Operation (iii) in the foregoing list is performed using an attribute query. At this stage in the proceedings, the chatbot interface has drilled down more and filtered the California fires to display only the ones bigger than 100,000 acres.

The user then says: "show me the agency layer." The chatbot interface responds by: (i) converting this speech to text; (ii) displaying this text in the chatbot window; (iii) displaying a new map display showing a new map similar to the map displayed in the operations of the previous paragraph but with one more layer added to the map, displaying agency data; and (iv) displays text in the chatbot window that reads "2017 California fires over 100,000 acres in area are now displayed with an agency data overlay."

The user then says: "From these fires show me only fires started on United States Forest Service land." The chatbot interface responds by: (i) converting this speech to text; (ii) displaying this text in the chatbot window; (iii) displaying a new map display showing a new map similar to the map displayed in the operations of the previous paragraph but with additional filtration such that only fires that started on United States Forest Service land are shown by cross-hatched areas; and (iv) displays text in the chatbot window that reads "2017 California fires over 100,000 acres in area and started on United States Forest service land are now displayed with an agency data overlay." This process of "drilling down" can continue if user wants to filter the data more helping in refining the final result. Once a final result is met the user can ask to see the tabular information of the fire data filtered.

In another example of the present invention a user may be looking to find all pizza places that meet the following filtration criteria: (i) the user can drive to the pizza place in a maximum time of thirty (30) minutes from the user's current location; and (ii) the pizza place is close to a Walmart location.

In another example of the present invention a user may be looking to find all private schools and proximate houses that meet the following filtration criteria: (i) a specific tuition price range; and (ii) close to houses for sale that are in a specific price range.

In another example of the present invention a user may be looking to find all houses that meet the following filtration criteria: (i) house is for sale; (ii) in a specific set of cities; (iii) built after 2000; (iv) at walking distance to a park; and (iv) at a walking distance from a grocery store.

Some embodiments of the present invention may include one, or more, of the following features, characteristics, operations and/or advantages: (i) receiving natural language input data from a user; (ii) parsing the natural language input data to determine a geographic area; (iii) displaying a map of the geographic area to the user; (iv) the natural language input data is received through a chatbot; (v) the natural language input data is text based; and/or (vi) the natural language input data is speech based.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   displaying, on a display device, a first geographic map representing a first geographic area in human understandable form and format, with the first geographic map including a visual indication of N map attribute features of a first type of map attribute, with N being an integer greater than one;
   receiving, from a user and through a geospatial chatbot, first natural language user input, with the geospatial chatbot being an artificial intelligence computer program is programmed to conduct conversations via auditory or textual methods;
   responsive to the receipt of the first natural language user input, parsing, by the geospatial chatbot, the first natural language user input to determine a numerical filtration range that numerically limits the first type of map attribute;
   further responsive to the receipt of the first natural language user input, generating a second map display data set corresponding to a second geographic map of the of the first geographic area with a visual indication of map attribute features of the first type of map attribute filtered according to the numerical filtration range so that the second geographic map includes a visual indication of M map attribute features of a first type of map attribute, with M being an integer less than N; and
   displaying, on the display device, the second geographic map in human understandable form and format based on the second map display data set;
   wherein the first type of map attribute is one of the following: a demographic parameter that correlates with geography, an event parameter that correlates with geography, a type of business, residential property related or land subject to a wild fire.

2. A computer program product (CPP) comprising:
a set of storage device(s); and
computer code stored on the set of storage device(s), with the computer code including data and instructions for causing a processor(s) set to perform at least the following operations:
   displaying, on a display device, a first geographic map representing a first geographic area in human understandable form and format, with the first geographic map including a visual indication of N map attribute features of a first type of map attribute, with N being an integer greater than one,
   receiving, from a user and through a geospatial chatbot, first natural language user input, with the geospatial chatbot being an artificial intelligence computer program is programmed to conduct conversations via auditory or textual methods,
   responsive to the receipt of the first natural language user input, parsing, by the geospatial chatbot, the first natural language user input to determine a numerical filtration range that numerically limits the first type of map attribute,
   further responsive to the receipt of the first natural language user input, generating a second map display data set corresponding to a second geographic map of the of the first geographic area with a visual indication of map attribute features of the first type of map attribute filtered according to the numerical filtration range so that the second geographic map includes a visual indication of M map attribute features of a first type of map attribute, with M being an integer less than N, and
   displaying, on the display device, the second geographic map in human understandable form and format based on the second map display data set;
   wherein the first type of map attribute is one of the following: a demographic parameter that correlates with geography, an event parameter that correlates with geography, a type of business, residential property related or land subject to a wild fire.

3. A computer system (CS) comprising:
a processor(s) set;
a set of storage device(s); and
computer code stored on the set of storage device(s), with the computer code including data and instructions for causing the processor(s) set to perform at least the following operations:
- displaying, on a display device, a first geographic map representing a first geographic area in human understandable form and format, with the first geographic map including a visual indication of N map attribute features of a first type of map attribute, with N being an integer greater than one,
- receiving, from a user and through a geospatial chatbot, first natural language user input, with the geospatial chatbot being an artificial intelligence computer program is programmed to conduct conversations via auditory or textual methods,
- responsive to the receipt of the first natural language user input, parsing, by the geospatial chatbot, the first natural language user input to determine a numerical filtration range that numerically limits the first type of map attribute,
- further responsive to the receipt of the first natural language user input, generating a second map display data set corresponding to a second geographic map of the of the first geographic area with a visual indication of map attribute features of the first type of map attribute filtered according to the numerical filtration range so that the second geographic map includes a visual indication of M map attribute features of a first type of map attribute, with M being an integer less than N, and
- displaying, on the display device, the second geographic map in human understandable form and format based on the second map display data set;
wherein the first type of map attribute is one of the following: a demographic parameter that correlates with geography, an event parameter that correlates with geography, a type of business, residential property related or land subject to a wild fire.

* * * * *